United States Patent
Haworth

(10) Patent No.: US 6,450,935 B1
(45) Date of Patent: Sep. 17, 2002

(54) METHOD FOR REMOVING ESSENTIAL OILS AND ANTIOXIDANTS FROM EXTRACT PRODUCTS OF LAMIACEAE SPECIES USING ROLLED FILM EVAPORATION

(75) Inventor: James E. Haworth, Des Moines, IA (US)

(73) Assignee: Kemin Industries, Inc., Des Moines, IA (US)

( * ) Notice: Subject to any disclaimer, the term of this patent is extended or adjusted under 35 U.S.C. 154(b) by 185 days.

(21) Appl. No.: 09/688,266

(22) Filed: Oct. 13, 2000

(51) Int. Cl.[7] .................................................. C07C 1/00
(52) U.S. Cl. .......................................... 584/21; 584/20
(58) Field of Search ....................................... 584/20, 21

(56) References Cited

U.S. PATENT DOCUMENTS

| | | |
|---|---|---|
| 3,669,679 A | 6/1972 | Panzer |
| 3,950,266 A | 4/1976 | Chang |
| 4,354,035 A | 10/1982 | Christ |
| 4,358,442 A | 11/1982 | Wirtz-Peitz |
| 4,380,506 A | 4/1983 | Kimura |
| 4,450,097 A | 5/1984 | Nakatani |
| 4,638,095 A | 1/1987 | Chang |
| 5,176,913 A | 1/1993 | Honerlagen |
| 5,209,870 A | 5/1993 | Todd |
| 5,256,700 A | 10/1993 | Aeschbach |
| 5,433,949 A | 7/1995 | Kahleyss |
| 5,512,285 A | 4/1996 | Wilde |
| 5,525,260 A | 6/1996 | Aeschbach |

FOREIGN PATENT DOCUMENTS

| | | |
|---|---|---|
| EP | 0616821 A1 | 9/1994 |
| GB | 2308358 | 6/1997 |
| GB | 2324050 | 10/1998 |
| JP | 55018436 | 2/1980 |
| JP | 58217584 | 12/1983 |
| JP | 60224629 A | 11/1985 |
| JP | 61024522 A | 2/1986 |
| JP | 61027910 A | 2/1986 |
| JP | 02092258 A | 4/1990 |
| WO | WO 95/18834 | 7/1995 |
| WO | WO 95/26794 | 10/1995 |
| WO | WO 96/34534 | 11/1996 |

OTHER PUBLICATIONS

Ernest Wenkert, et al., Chemical Artifacts from the Family Labiatae, 30 J. Org. Chem. 2931 (1965).
Stephens S. Chang, et al., Natural Antioxidants from Rosemary and Sage, 42 J. Food Sci. 1102 (1977).

(List continued on next page.)

Primary Examiner—Deborah Carr
(74) Attorney, Agent, or Firm—Kent A. Herink; Daniel A. Rosenberg; Jill A. Altringer

(57) ABSTRACT

An increase in specific antioxidant activity of extracts from rosemary (*Rosemarinus officinalis*) is obtained by the use of a blend of tetrafluoroethane and an organic solvent in the extraction process. A blend of tetrafluoroethane, acetone and methanol improves total yield. A tetrafluoroethane and acetone blend has higher efficacy but comparatively lower yields. The methods yield a liquid and oily antioxidant extract that is readily mixed with a liquid product such as soybean oil for addition to animal feeds and human food. The methods simultaneously yield pharmaceutical-grade essential oils in high yields.

15 Claims, 6 Drawing Sheets

OTHER PUBLICATIONS

G.W. Burton & K.U. Ingold, Vitamin E as an in Vitro and in Vivo Antioxidant, in Vitamin E: Biochemistry and Health Implications 7, 7–22 (A.T. Diploch, et al., eds., 1989).

O.I. Aruoma, et al., Antioxidant and Pro–oxidant Properties of Active Rosemary Constituents: Carnosol and Carnosic Acid, 22 Xenobiotica 257 (1992).

Shun Wada & Xing Fang, The Synergistic Antioxidant Effect of Rosemary Extract and alpha–Tocopherol in Sardine Oil Model System and Frozen–Crusted Fish Meat, 16 J. Food Processing & Preservation 263 (1992).

Qinyun Chen, et al., Effects of Rosemary Extracts and Major Constituents on Lipid Oxidation and Soybean Lipoxygenase Activity, 69 J. Am. Oil Chem. Soc. 999 (1992).

Xin Fang & Shun Wada, Enhancing the Antioxidant Effect of Alpha–Tocopherol with Rosemary in Inhibiting Catalyzed Osidation Caused by Fe2+ and Hemoprotein, 26 Food Res. International 405 (1993).

J. Loliger, Natural Antioxidants, Rancidity in Foods 89, 89–107 (J.C. Allen & R.J. Hamilton, eds., 1994).

Jon W. Wong, et al., Antioxidant Activities of Rosemary and sage Extracts and Vitamin E in a Model Meat System, 43 J. Agric. Food Chem. 2707 (1995).

US 6,450,935 B1

METHOD FOR REMOVING ESSENTIAL OILS AND ANTIOXIDANTS FROM EXTRACT PRODUCTS OF LAMIACEAE SPECIES USING ROLLED FILM EVAPORATION

BACKGROUND OF THE INVENTION

1. Field of the Invention

The invention relates generally to a method for removing by wipe or rolled film evaporation essential oils and antioxidants from extracts of organic material, more particularly organic material from the Lamiaceae (or Labiatae) family, including rosemary (*Rosemarinus officinalis*). The fraction containing antioxidants is suitable for addition to animal feeds and human food. The essential oils are pharmaceutical grade.

2. Background of the Prior Art

Worldwide demand for natural antioxidants has been rising due to safety concerns about synthetic food and feed additives and the public perception that natural food and feed supplements provide certain health benefits. The most important natural antioxidants being exploited commercially today are tocopherols. Tocopherols have a potent ability to inhibit lipid peroxidation in vivo by trapping peroxy-radicals (Burton, G. W., and K. U. Ingold (1989), in Vitamin E: Biochemistry and Health Implications, edited by A. T. Diplock, L. J. Machlin, L. Packer and W. A. Pryor, The New York Academy of Sciences, New York, pp. 7–22). Various herbal extracts for use as natural antioxidants are being explored. Possibilities include the extraction of rosemary or other botanical sources. Such new antioxidants may play a role in combating carcinogenesis as well as the aging process, and may be applicable in the nutraceutical industry.

Among the various natural extracts available in the market are rosemary extracts, which are reported to be highly effective in retarding lipid oxidation and protecting living cells from the damaging oxidative stress (Chen, Q., H. Shi and C-T Ho (1992), "Effects of rosemary extracts and major constituents on lipid oxidation and soybean lipoxygenase activity", J Am Oil Chem Soc 69: 999–1002; Wong, J. W., K. Hashimoto and T. Shibamoto (1995), "Antioxidant activities of rosemary and sage extracts and vitamin E in a model meat system", J Agric Food Chem 43: 2707–2712). These extracts are described as being superior to vitamin E, a well-known natural antioxidant and food supplement, in many food model systems (Lolinge, J. (1983), Natural antioxidants in Allen, J. C. and R. J. Hamilton eds, Rancidity in Foods, Elsevier Applied Science, London, Chapter 6). However, opposite findings are also documented. Wong et al. (1995) revealed that vitamin E is more effective than rosemary extract in a cooked beef homogenate. Additionally, rosemary extract is shown to be a synergist of vitamin E in stabilizing or retarding oxidation in sardine oil and fish muscle (Fang, X. and S. Wanda (1993), "Enhancing the antioxidant effect of α-tocopherol with rosemary extract in inhibiting catalyzed oxidation caused by $Fe^{2+}$ and hemoprotein", Food Res Int 26: 405–411; Wanda, S. and X. Fang (1992), "The synergistic antioxidant effect of rosemary extract and α-tocopherol in sardine oil model system and frozen-crushed fish meat", J Food Process Preserv 16: 263–274).

As to the extraction of rosemary, many authors report that polar solvents yield extracts with higher antioxidant activities (Chang, S. S., B. Ostric-Matijasevic, C-L Huang and OA-L Hsieh (1977), "Natural antioxidants from rosemary and sage", J Food Sci 42: 1102–1106). Chen et al. (1992) found that hexane extracts of rosemary contained a higher content of carnosic acid and carnosol than methanol extracts do. Carnosic acid and carnosol are the effective antioxidant molecules in rosemary. Carnosic acid and carnosol have been suggested to account for over 90% of the antioxidant activity of rosemary extracts (Aruoma, O. I, B. Halliwell, R. Aeschbach and J. Loligers (1992) "Antioxidant and pro-oxidant properties of active rosemary constituents: carnosol and carnosic acid", Xenobiotica 22: 257–268). Antioxidant molecules in general, and rosemary antioxidants specifically, are by nature labile molecules especially when exposed to heat and/or air. During the harvest, the drying, and the regular solvent extraction of rosemary, some oxidation is likely to occur. Through a process of chemical reactions, carnosic acid, the naturally-occurring antioxidant molecule in rosemary, is believed to be the precursor to carnosol and many other antioxidants found therein (Wenkert, E., A. Fuchs, J. D. McChesney (1965), "Chemical artifacts from the family labiate", J. Org. Chem. 30: 2931–2934). It can be demonstrated that the freshly cut leaves of rosemary do not contain carnosol (Aeschbach, R. and L. Philippossian (1993), "Carnosic acid obtention and uses", U.S. Pat. No. 5,256,700). Carnosic acid is about 10 times more effective as an antioxidant than carnosol (Aruoma et al., 1992), and it, therefore, is important for the high activity of a rosemary extract to minimize the damage to carnosic acid.

Essential oils are volatile oils which are the aroma and flavor components of organic material. They are used in a variety of products such as incense, aromatherapy oils, perfumes, cosmetics, pharmaceuticals, beverages, and foods. The market for these oils demands consistent high quality and reliable supplies at competitive prices. Essential oils are typically commercially extracted from organic material such as rosemary using steam distillation. In this prior art process, the antioxidants are destroyed, and thermal degeneration of the essential oils may occur.

An improved method for the simultaneous extraction of both antioxidant compounds and essential oils form species of the family Lamiaceae is described in pending patent application Ser. No. 09/206,458, which was filed Dec. 7, 1998, and is incorporated herein by this reference. Using tetrafluoroethane (TFE) in combination with one or more co-solvents, extracts of organic material are made that have a high level of antioxidant activity and further contain much of the essential oils present in the organic material. The essential oils are pro-oxidants, however, and further may limit the amount of the extract that may be used in certain antioxidant applications due to the odor of the essential oils. Further, essential oils of some species have a high market value apart from the antioxidant compounds. Accordingly, there is a need to remove and preserve the essential oils from the extract without substantially degrading the activity of the antioxidant compounds. There is also a need to purify further the antioxidant compounds, particularly carnosic acid, that may be present in the extract.

SUMMARY OF THE INVENTION

This invention is directed to a method of removing antioxidants and essential oils from the extract products of organic materials while preserving the activity of the compounds.

A purpose of the present invention is to provide a method using rolled film evaporation for removing antioxidants and essential oils from extracts of plants of the family Lamiaceae, particularly rosemary, that yields a fraction containing the essential oils of the plant material and a fraction that contains the antioxidant compounds present in the extract substantially free from odor and suitable for incorporation into animal feeds and human foods.

A further purpose of the present invention is to provide a method for removing antioxidants and essential oils from extracts of rosemary in high yields and high purity.

The organic material used during testing was dried, finely ground rosemary of the Arp variety. It is anticipated that the organic material can be any plant of the Lamiaceae family, and more broadly, any plant material which contains antioxidants and essential oils. It is also expected that any parts of the plant which contain the desired components may be extracted, as well as any form of the plant material (e.g., whole, ground, fresh, or dried).

Tetrafluoroethane (1,1,1,2) was used in the solvent blend. Tetrafluoroethane has a boiling point of −27° C. The technology utilizes the vapor pressure of the solvent at room temperature and allows extraction under mild conditions, therefore minimizing the oxidative decomposition of carnosic acid during the extraction process. Tetrafluoroethane is substantially apolar and is preferably blended with acetone in the extractions of rosemary described here. The advantages of TFE show that it is non-flammable, has a low boiling point, is environmentally acceptable (very low toxicity), and is easily handled. Among numerous solvent blends tested, an 80/15/5 weight percent blend of TFE/methanol/acetone, respectively, proved to be an effective solvent resulting in a liquid extract with up to 130% of the efficacy of mixed tocopherols (when using plant material gathered from the publicly available rosemary variety Arp), and an antioxidant yield of about 60% of the rosemary antioxidants. The antioxidant efficacy of the liquid extract is lipid dependent. Oxygen bomb data presented in this disclosure was obtained using purified chicken fat. The antioxidant yield is based on a comparison of the total amount of antioxidants extracted from the same variety of rosemary using methanol as the sole solvent. Such methanol-only extracts, however, have undesirable physical characteristics.

The organic material and solvent blend are added together in a 1:3 (organic material:solvent blend) or higher (i.e., 1:4, 1:5, etc.) weight ratio to perform the extraction step in any vessel which will be compatible with the components. Since the TFE is preferably added in liquid form, the vessel has to be a pressure vessel which will withstand pressures equal to those required to maintain the TFE in liquid form. The extraction has been carried out at ambient temperatures, but the pressure and temperature may be varied, so long as the TFE and organic solvents remain in liquid form.

The method for removing the organic material from the solution was filtration. Any suitable separation process known to one skilled in the art which does not interfere with the other steps of the method may be used.

The removal of the solvent blend has been accomplished by evaporation. The TFE and organic solvent(s) may be removed by any suitable method known to one skilled in the art as well. A thin film evaporator has been found to be particularly suitable for this process.

The extract, after removal of the TFE, methanol and acetone, is passed through a rolled film evaporator under vacuum at a temperature in the range of about 65° C. to about 120° C., and preferably between about 80° C. and 90° C. The remaining volatile components of the extract include the essential oils of the organic material. These volatile compounds are evaporated in the rolled film evaporator and collected in distillate fractions. The residue is a viscous oily product that contains many of the antioxidant compounds that were present in the organic material. Because most of the essential oils were removed by the rolled film evaporator, the residue is essentially odor free and can therefore be used in applications where the extract containing the essential oils was found to be unsatisfactory, for example in protecting the fats in dog food from oxidation. The residue has a high percentage of antioxidant compounds. For example, the residue contains between about 10% and about 50% carnosic acid, and typically about 30% carnosic acid.

If the temperature of the rolled film evaporator is increased to between about 150° C. and 195° C., and preferably between about 160° C. and 185° C., the distillate is found to include the essential oils, as before, but it also exhibits antioxidant activity. It is believed that the antioxidant compounds present in the extract, for example, carnosic acid and/or carnosol, are evaporated at the higher temperatures and therefore are present in the distillate.

The essential oils resulting from rolled film evaporation at the lower temperature range are of very high purity (pharmaceutical grade) and surprisingly high yields (compared to previous extraction methods for obtaining essential oils). The distillate at the higher temperature range is a product which contains the essential oils but also exhibits antioxidant activity.

DETAILED DESCRIPTION OF THE PREFERRED EMBODIMENTS

Figure 1:
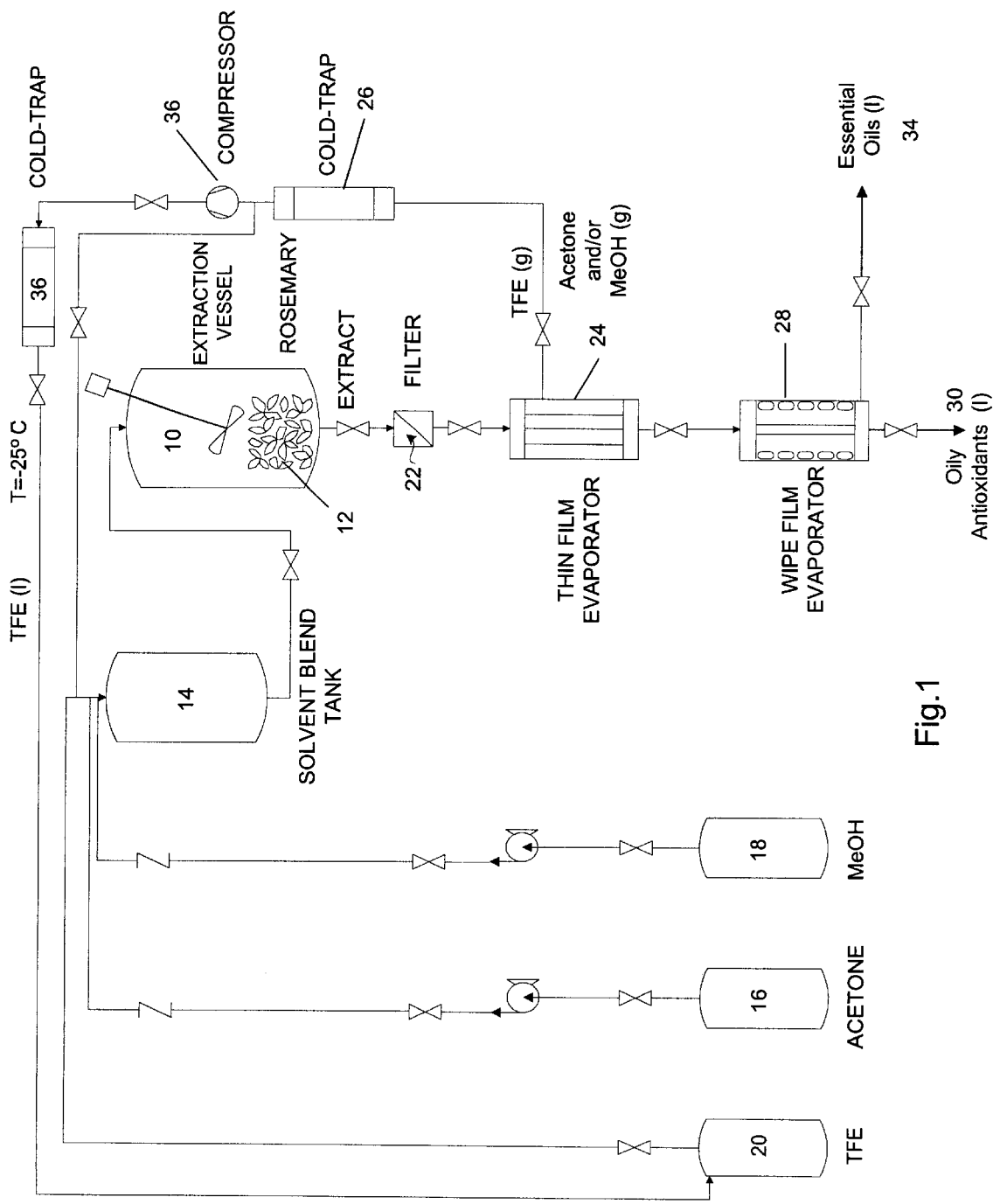
FIG. 1 is a process diagram of the preferred embodiment of the extraction method of the present invention.

The preferred embodiment of the method of the present invention is shown in FIG. 1. The process includes an extraction vessel 10 where the organic material 12 is extracted using the solvent blend preferably at a pressure equal to that necessary to keep the TFE in liquid form and at ambient temperature. The solvent blend is premixed in a solvent blend tank 14 before being added to the extraction vessel 10 where the organic material 12 has been added. The solvents are added to the solvent blend tank 14 from fresh supply tanks, acetone tank 16, methanol tank 18, and TFE tank 20, or alternatively, recycled from the end separation techniques.

When the desired natural organic components have been extracted from the organic material 12 after a sufficient residence time, the mixture is passed through a filter 22. The filtered extract then passes through a thin film evaporator 24 where the TFE and methanol/acetone are removed as gasses and the remaining extract passes to the next step. The removed TFE and methanol/acetone are recycled back through a cold-trap 26 that is at a temperature to liquefy the methanol and acetone but not the TFE. The liquefied co-solvents are returned to the solvent blend tank 14. The gaseous TFE is moved by a compressor 34 through a second cold trap 36 which liquefies the TFE, whereupon it is returned to the TFE tank 20 for reuse.

The solvent-free extract then passes through a rolled film evaporator 28 where the antioxidant 30 and essential oil 34 fractions of the extract are collected.

methanol/between about 5% and 15% acetone) were combined to make up a sample for evaporation in a rolled film evaporator. The extract samples were weighed and an equal weight of surfactant, namely ATMOS 300, a 9-octadecenoic acid monoester with 1,2,3-propanetriol available from Henkel Corporation, was added to improve the physical properties of the extract. The surfactant assisted in at least two ways. First, due to the extremely low vacuum of the rolled film evaporator, the extracts without the surfactant tend to have components that evaporate so quickly that the product is atomized as it enters the evaporator. Further, the surfactant improves the viscosity of the extract so that it flows better through the evaporator and may also form an improved, more uniform thin film over the cylinder of the evaporator. Any oil or surfactant, or other compound, which contributes similar properties to the extract could alternatively be used.

In the samples used in this Example 1, the product subjected to rolled film evaporation comprised 2015 g, of which 932.0 g were the TFE-solvent blend extract of rosemary, 932.0 g of ATMOS 300 surfactant, and 151 g water. This product was passed through a KDL-9 rolled film evaporator purchased from UIC, Inc., Chicago, Ill., in two passes at the temperatures and conditions as set out in Table 1.

TABLE 1

| Parameter | Pass 1 | | | | | Pass 2 | | | | | |
| --- | --- | --- | --- | --- | --- | --- | --- | --- | --- | --- | --- |
| | 1 | 2 | 3 | 4 | 5 | 1 | 2 | 3 | 4 | 5 | 6 |
| Feed Heat - °C. | n/a | n/a | n/a | n/a | n/a | n/a | n/a | n/a | n/a | n/a | n/a |
| Feed Temp - °C. | amb. | amb. | amb. | amb. | amb. | amb. | amb. | amb. | amb. | amb. | amb. |
| Evaporator In - °C. | 55 | 55 | 60 | 70 | 85 | 85 | 100 | 120 | 135 | 150 | 175 |
| Evaporator Out - °C. | 53 | 53 | 58 | 68 | 83 | 83 | 99 | 118 | 133 | 148 | 173 |
| Condenser - °C. | 0 | 0 | 0 | 0 | 0 | 21 | 10 | 5 | 15 | 20 | 30 |
| Residue - °C. | 53 | 53 | 53 | 53 | 53 | 53 | 53 | 54 | 55 | 55 | 55 |
| Vacuum - mm Hg | 600 | 100 | 100 | 100 | 100 | .002 | .002 | .002 | .002 | .002 | .002 |
| Feed rate - ml/hr | 370 | 360 | 360 | 360 | 360 | 360 | 360 | 360 | 360 | 360 | 360 |
| Feed rate - g/hr | 417 | 408 | 409 | 410 | 412 | 382 | 380 | 382 | 423 | | |
| Distillate Gross - g | 198.3 | 243.2 | 228.6 | 224.7 | 232.7 | | | | 194.2 | 189.2 | 200.3 |
| Distillate Tare - g | 188.7 | 188.7 | 193.7 | 187.3 | 192.3 | | | | 192.3 | 188.7 | 188.4 |
| Distillate Net - g | 9.6 | 54.5 | 34.9 | 37.4 | 40.4 | | | | 1.9 | 0.5 | 11.9 |
| Residue Gross - g | 270.5 | 474.0 | 357.2 | 358.1 | 358.1 | 274.3 | 258.1 | 219.2 | 230.7 | | |
| Residue Tare - g | 210.6 | 188.7 | 187.4 | 190.3 | 192.7 | 210.6 | 188.7 | 187.4 | 190.3 | | |
| Residue Net - g | 59.9 | 285.3 | 169.8 | 167.8 | 165.4 | 63.7 | 63.4 | 31.8 | 40.4 | | |
| Total mass - g | 69.5 | 339.8 | 204.7 | 205.2 | 205.8 | 63.7 | 63.4 | 31.8 | 42.3 | 0.5 | 11.9 |
| Distillate % | 13.8 | 16.0 | 17.0 | 18.2 | 19.6 | | | | 4.5 | 100 | 100 |
| Residue % | 86.2 | 84.0 | 83.0 | 81.8 | 80.4 | 100 | 100 | 100 | 95.5 | | |
| Roller Basket rpm | 425 | 425 | 425 | 425 | 425 | 425 | 425 | 425 | 425 | 425 | 425 |
| Amt Time - min | 10 | 30 | 30 | 30 | 30 | 10 | 10 | 5 | 6 | 5 | 12 |
| Time | 9:20 | 9:56 | 10:45 | 11:20 | 12:00 | 14:40 | 14:50 | 14:05 | 14:15 | 14:20 | 14:40 |

The methods of this invention are further illustrated by the following experimental examples.

EXAMPLES

Example 1

The invention identifies methods of removing the essential oils from extracts of organic material, particularly TFE extracts of species of the family Lamiaceae, and to a method of producing essential oils that have antioxidant properties.

Four samples of extracts from rosemary using the above-described process of extraction using a TFE—solvent blend (approximately 80% TFE/between about 5% and about 15%

Figure 2:
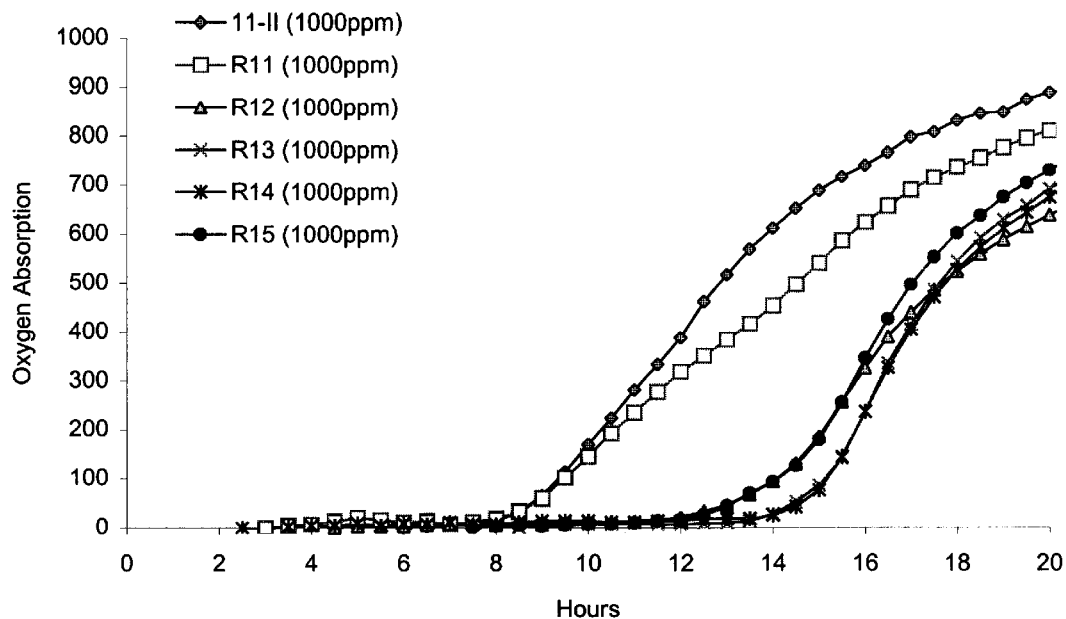
FIG. 2 is a chart of the antioxidant efficacy of a sample of rosemary extracted according to described Method 1 compared with the residues following rolled film evaporation under a variety of conditions.

All samples were tested in untreated chicken fat at a treatment level of either 500 or 1,000 ppm, as indicated. These samples were then placed into an oxygen bomb pressurized to 50 psi with oxygen, placed in silicon oil at 100° C. and allowed to oxidize. FIG. 2 illustrates the oxygen absorption of the starting product, identified as 11—11, as well as that of the residues of the five samples taken in the first pass through the rolled film evaporator. The chart shows that the later four residues, identified as R12–R15, had much higher antioxidant activity than the control or starting product and the first residue, identified as R11.

Figure 3:
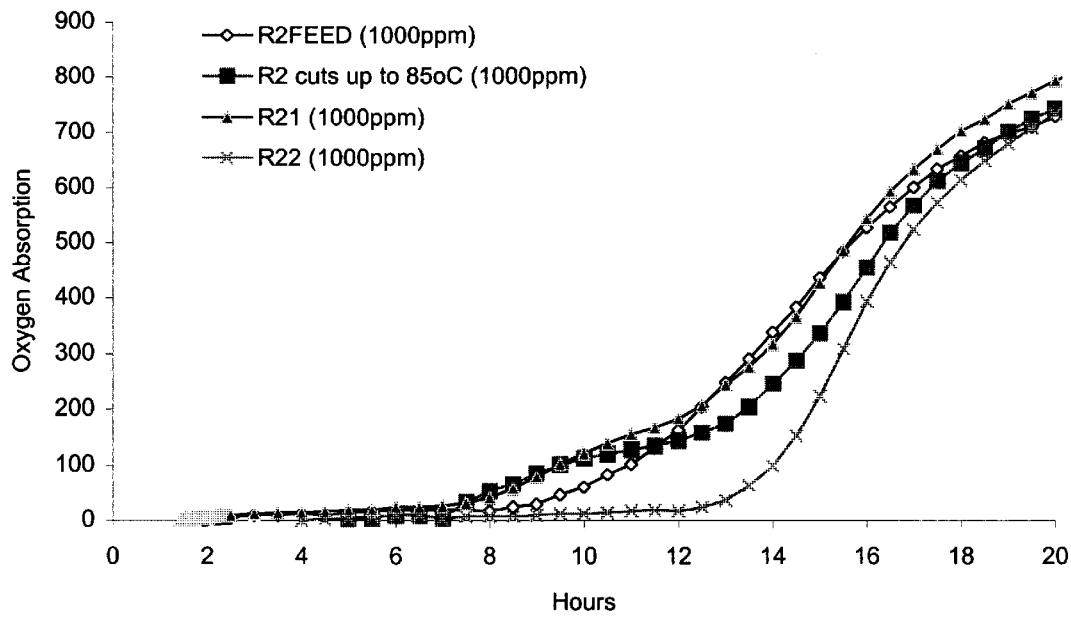
FIG. 3 is a chart of the antioxidant efficacy of the residues from FIG. 2 compared with residues following rolled film evaporation of the residue under a variety of conditions.
Figure 4:
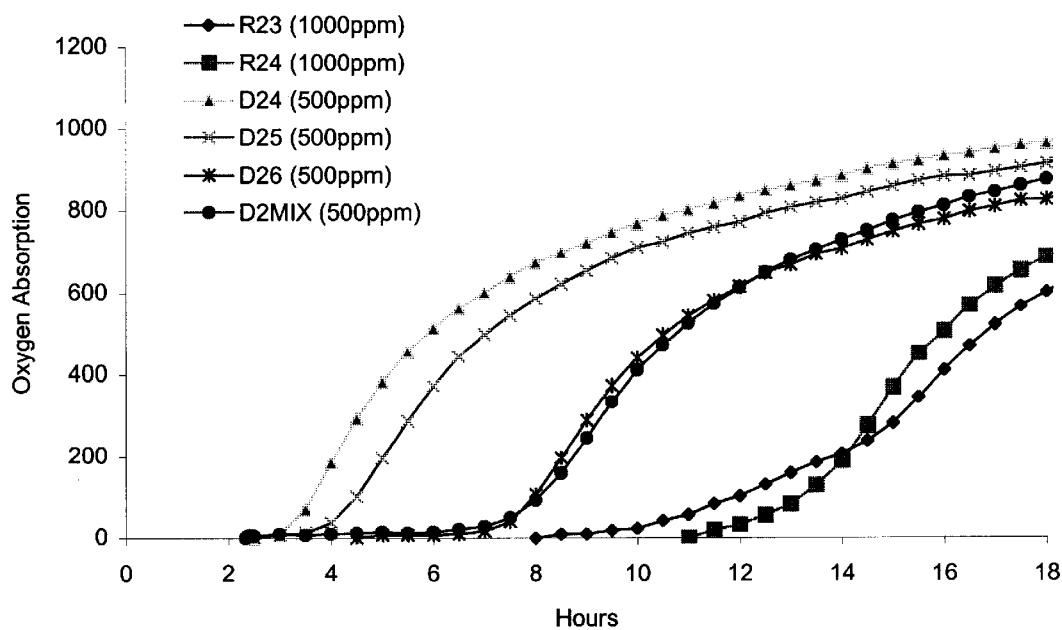
FIG. 4 is a chart of the antioxidant efficacy of a number of residues and distillates following rolled film evaporation of the residues from FIG. 2.

FIGS. 3 and 4 illustrate the oxygen absorption of the combined residues from the first pass, identified as R2FEED and the residues and distillates taken during the second pass through the rolled film evaporator. In FIG. 3, it seen that there may be some increased antioxidant activity in the first and second samples taken during the second pass, identified as R21 and R22, respectively, over the combined residues of the first pass, R2FEED. In FIG. 4, the oxygen bomb data of the distillates collected during the second pass are illustrated with the third and fourth residues collected during the second pass. It is seen that the sixth distillate, D26, has an antioxidant activity that is much improved over the earlier distillates taken at lower temperatures.

Example 2

For Experiment 2, two extracts of rosemary were prepared using the process as previously described, wherein one extract was obtained using a solvent blend comprising 85.7% TFE/7.14% methanol/7.14% acetone (identified as Zwag 1), and the second extract was obtained using a solvent blend comprising 80% TFE/13.3% methanol/6.7% acetone (identified as Zwag 2). The two extracts were combined to form an extract for processing in the rolled film evaporator. Five hundred grams of soybean oil was mixed with 550 g of the combined extract samples (52.4% extract/47.6% soybean oil). This mixture was run through the rolled film evaporator under the conditions set out in Table 2. In all experiments, some material was observed to splatter over to the condensing column. The amount of the material was not great but may have some affect on the distillate data. A liquid nitrogen cold finger was used to trap any material that was not trapped in the condensing tubes and is reported in the last row of Table 2.

TABLE 2

| Parameter | Pass 1 | | | | |
|---|---|---|---|---|---|
| Sample tube # | 1 | 2 | 3 | 4 | 5 |
| Evaporator - °C. | | | 100 | 110 | 120 |
| Condenser - °C. | | | 0 | 0 | 0 |
| Vacuum - mbar | | | .0015 | .0015 | .0016 |
| Feed rate - RPM | | | 148 | 148 | 149 |
| Distillate Net - g | .61 | 17.28 | 8.79 | 8.1 | 8.26 |
| Residue Net - g | 258.3 | 131.15 | 136.42 | 144.95 | 135.28 |
| Roller Basket rpm | | | 320 | 320 | 320 |
| Amt Time - min | | | 5 | 5 | 5 |
| Cold Trap Mass - g | | | | | 72.4 |

Figure 5:
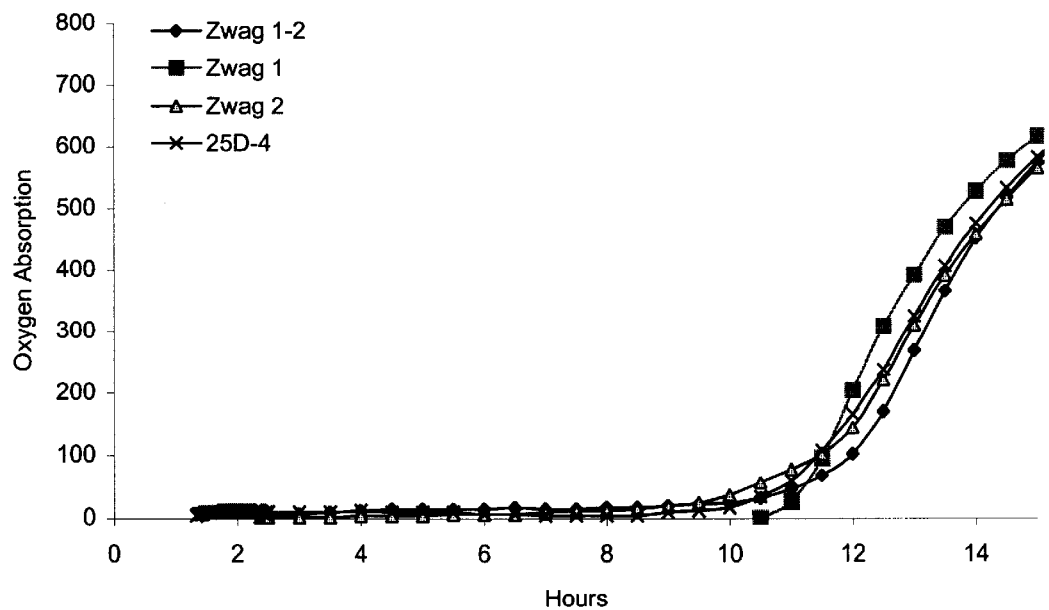
FIG. 5 is a chart of the antioxidant efficacy of residues before and following combination with soybean oil and processing by rolled film evaporation.

An oxygen bomb test was performed on Zwag 1, Zwag 2, and the fourth distillate sample collected (identified as 25D-4), under the conditions set out previously. The data is reported in FIG. 5. A comparison of the oxygen bomb data and data from Tables 1 and 2 reveals that there is no real difference observed whether ATMOS or soybean oil is mixed with the extract, although the soybean oil may improve the blending characteristics of the extract.

Example 3

To examine the effect of reducing the amount of soybean oil used in the mixture run through the rolled film evaporator, two samples were prepared, Sample 75, comprised of 75% of the solvent blend extract and 25% soybean oil, and Sample 65, comprised of 65% of the solvent blend extract and 35% soybean oil. When Sample 75 was run through the evaporator (with an evaporator temperature of 43.2° C., a condenser temperature of −11° C., and a vacuum of 0.0039 mm Hg, the sample flashed over and boiled immediately upon entering the evaporator. The data collected during a run of Sample 65 through the evaporator is set out in Table 3.

TABLE 3

| Parameter | Pass 1 | | | | | |
|---|---|---|---|---|---|---|
| Sample tube # | 1 | 2 | 3 | 4 | 5 | 6 |
| Evaporator - °C. | 50.5 | 50.2 | 50.2 | 60.3 | 60.2 | |
| Condenser - °C. | −4.0 | −4.1 | −5.0 | −6.2 | −7.1 | |
| Vacuum - mm Hg | 190 | 240 | 99 | 100 | 10 | |
| Feed rate - RPM | 133 | 133 | 133 | 133 | 133 | |
| Distillate Net - g | 16.74 | 5.83 | 8.57 | 7.97 | 3.2 | 6.76 |
| Residue Net - g | 191.77 | 96.85 | 115.99 | 97.97 | 96.05 | 130.34 |
| Total Mass - g | 208.51 | 102.68 | 124.56 | 105.94 | 99.25 | 137.0 |
| Distillate % | 8.03 | 5.68 | 6.88 | 7.52 | 3.22 | 4.87 |
| Residue % | 92.0 | 94.32 | 93.1 | 92.5 | 96.8 | 95.13 |
| Roller Basket rpm | 429 | 429 | 429 | 430 | 431 | 431 |
| Start time | 8:00 | 8:07.3 | 8:16.0 | 8:30.0 | 8:40.0 | |
| End time | | 8:12.3 | 8:22.0 | 8:35.0 | 8:45.0 | |
| Cold Trap Mass - g | | | | | 24.62 | |

Some flashing off of the evaporator was observed during collection of the fourth distillate, and the material in the residue tubes boiled during the collection of the fifth distillate, but flashing was not observed. Material started to accumulate in the liquid nitrogen cold trap during collection of the fifth distillate.

Example 4

The residue collected in the final stage of Experiment 3 was run through the evaporator a second time in an effort to remove more of the volatile materials in the extract. The results are reported in Table 4.

TABLE 4

| Parameter | Pass 1 | |
|---|---|---|
| Sample tube # | 1 | 2 |
| Evaporator - °C. | 60 | 80.3 |
| Condenser - °C. | −10 | −10 |
| Vacuum - mm Hg | | 0.07 |
| Feed rate - RPM | | 75 |
| Distillate Net - g | 1.36 | 5.48 |
| Residue Net - g | 58.3 | 121.0 |
| Total Mass - g | | 126.48 |
| Distillate % | | 4.33 |
| Residue % | | 95.7 |
| Roller Basket rpm | 431 | 431 |
| Start time | | 11:19 |
| End time | | 11:31 |
| Cold Trap Mass - g | | 5.17 |

Figure 6:
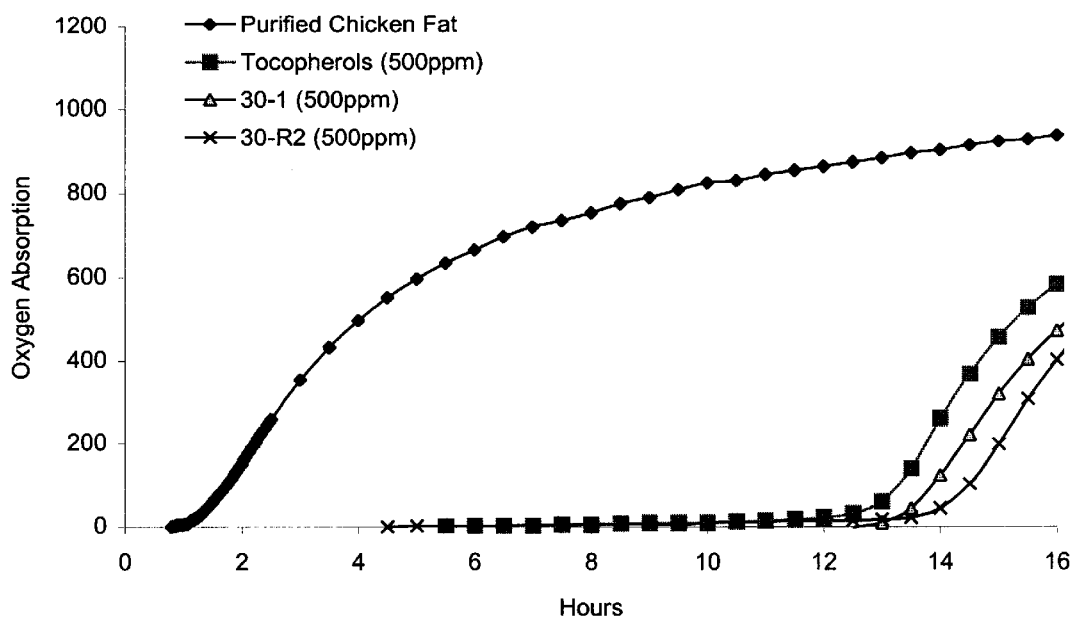
FIG. 6 is a chart of the antioxidant efficacy of tocopherols, the antioxidant fraction following rolled film evaporation of a 65% extract 35% soy bean oil mixture, and of the antioxidant fraction following a second pass through the rolled film evaporator.

Oxygen bomb data on the starting material (identified as 30-1) and the residue collected in sample tube #2 (identified as 30-R2) are reported in FIG. 6.

Example 5

An experiment was run to determine if the addition of water to the samples would improve the characteristics of the samples. Two samples were prepared, one comprising 65% of the solvent blend extract and 35% ATMOS 300, and the other with 5% water added (61.75% extract/33.25% ATMOS/5.0% water). The samples were run through the evaporator. No significant effect on the removal of the essentials oils from the extract was observed. One explanation for seeing no effect may be that the extract samples already contained a significant amount of water.

Example 6

From previous experiments, it was determined that the presence of water in the starting extract samples was preventing operation of the evaporator under conditions needed to remove a sufficient amount of the essential oils from the extract. Specifically, at the evaporator temperature and high vacuum needed to remove the essential oils, the samples would spatter and/or foam vigorously upon entering the evaporator and would frequently require disassembly and cleaning of the evaporator before it could be used again. An experiment was run that first used less aggressive conditions in the evaporator to remove most of the water (and/or other volatile contaminants), followed by a second pass through the evaporator of the residue collected during the first pass, wherein the evaporator would be set to the more aggressive conditions needed to assure removal of the essential oils from the extract.

A sample was prepared containing 65% of the solvent blend extract and 35% soybean oil. It was run through the evaporator at the conditions as set out in Table 5.

TABLE 5

| Parameter | Pass 1 |
| --- | --- |
| Sample tube # | 1 |
| Evaporator - ° C. | 65 |
| Condenser - ° C. | −4.5 to −10 |
| Vacuum - mm Hg | 10 |
| Feed rate - RPM | 150 |
| Feed rate - g/hr | 1342.4 |
| Distillate Net - g | 48.44 |
| Residue Net - g | 991.06 |
| Total Mass - g | 1118.67 |
| Distillate % | 11.41 |
| Residue % | 88.6 |
| Roller Basket rpm | 425 |
| Start time | 8:20 |
| End time | 9:10 |
| Cold Trap Mass - g | 79.17 |

The residue collected was then run through the evaporator a second time under the conditions set out in Table 6.

TABLE 6

| Parameter | Pass 1 |
| --- | --- |
| Sample tube # | 1 |
| Evaporator - ° C. | 100 |
| Condenser - ° C. | −7.7 |
| Vacuum - mm Hg | 0.06 |
| Feed rate - RPM | 150 |
| Feed rate - g/hr | |
| Distillate Net - g | 16.38 |
| Residue Net - g | 296.54 |
| Total Mass - g | 314.92 |
| Distillate % | 5.84 |
| Residue % | 94.16 |
| Roller Basket rpm | 425 |
| Start time | |
| End time | |
| Cold Trap Mass - g | 2.0 |

Figure 7:
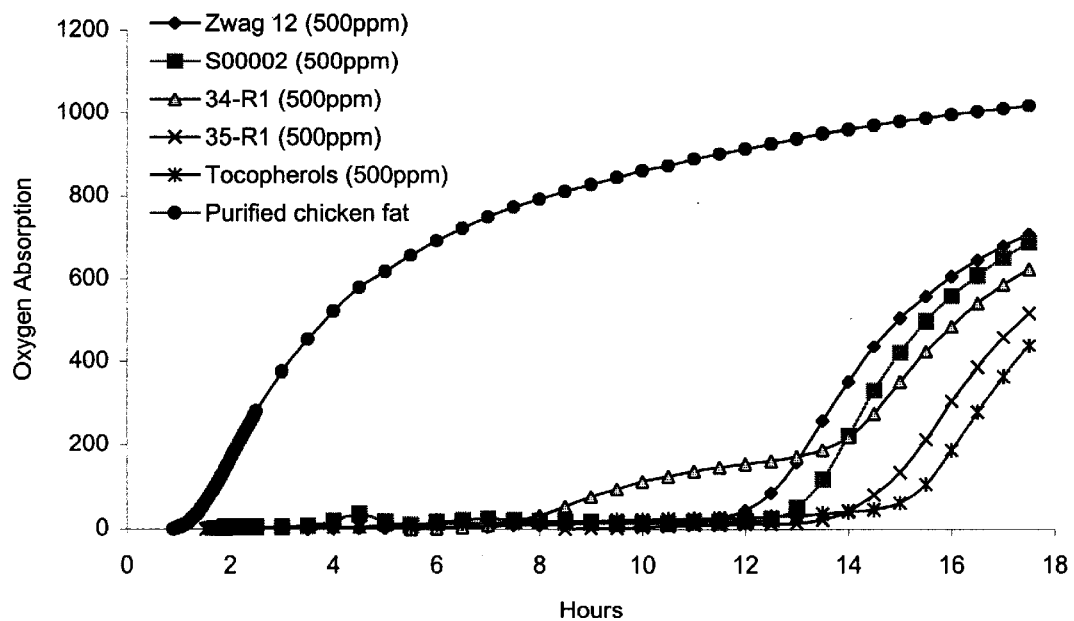
FIG. 7 is a chart of the antioxidant efficacy of tocopherols, a solvent blend extract, a soybean oil/solvent blend extract mixture, and residues collected after a first and after a second pass through the rolled film evaporator.

Oxygen bomb data on the initial extract (identified as Zwag 12), the starting sample (identified as S00002), the residue collected during the first run (identified as 34-R1) and the residue collected during the second run (identified as 35-R1), are displayed in FIG. 7 where they are compared against untreated chicken fat and chicken fat treated with an equivalent (in parts per million) of tocopherols.

Example 7

An experiment was conducted to compare the gas chromatograph/mass spectroscopy graphs of the essential oils obtained in the distillate collected from the rolled film evaporator with such graphs taken from a plurality of essential oil of rosemary products available in the commercial marketplace. Such essential oil products are produced by the use of steam distillation. Samples of the following commercial products were obtained: Oil of Rosemary, Ungerer & Company, Lincoln Park, N.J.; Oil Rosemary Moroccan, Citrus & Allied Essences, LTD., Floral Park, N.J.; Rosemary Oil, DMG, Murica, Spain; Oil of Rosemary, BERJE, Bloomfield, N.J.; Rosemary Oil Sureste, Aceites Esenciales y Derivados, S. A., Murica, Spain; Oil of Rosemary, Kalsec, Kalamazoo, Michigan; Rosemary Oil Spanish, Chart Corp., Inc., Paterson, N.J.; and Rosemary Oil Tunisian Pure, JPM Imports, Inc., Long Island City, N.Y. All samples were run on a Perkin Elmer gas chromatograph with a Perkin Elmer Turbo Mass mass spectrometer, using a PE-5ms (DB-5) column. The machine was operated at 40° C. for 1.5 minutes, and then a temperature gradient of 15° C. per minute was applied up to 300° C., which temperature was then held for 3.17 minutes. Samples were diluted in 20 parts acetone and a shot volume of 0.51 was used.

Figure 8:
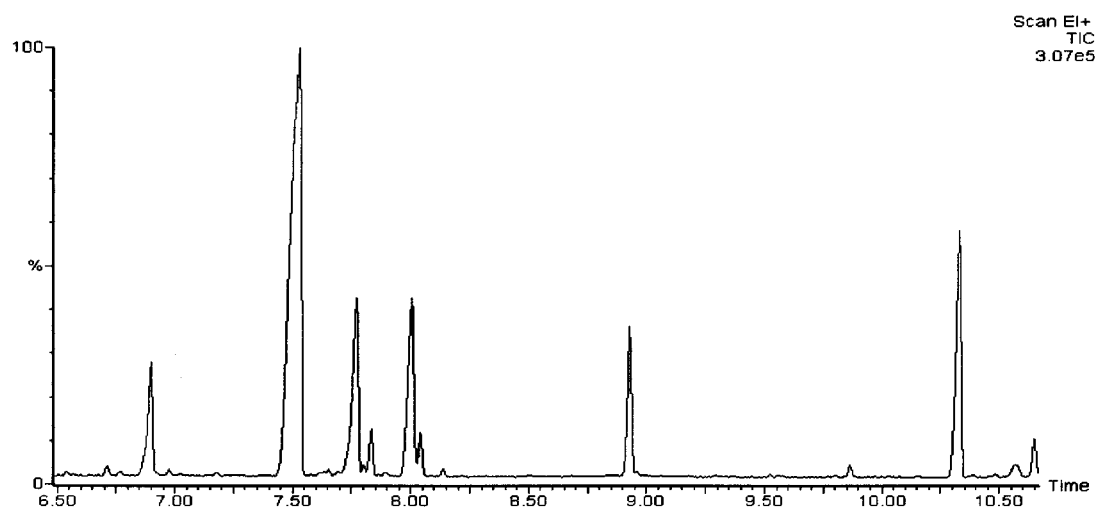
FIG. 8 is a GC/MS chart of a commercially available essential oil extract of rosemary.
Figure 9:
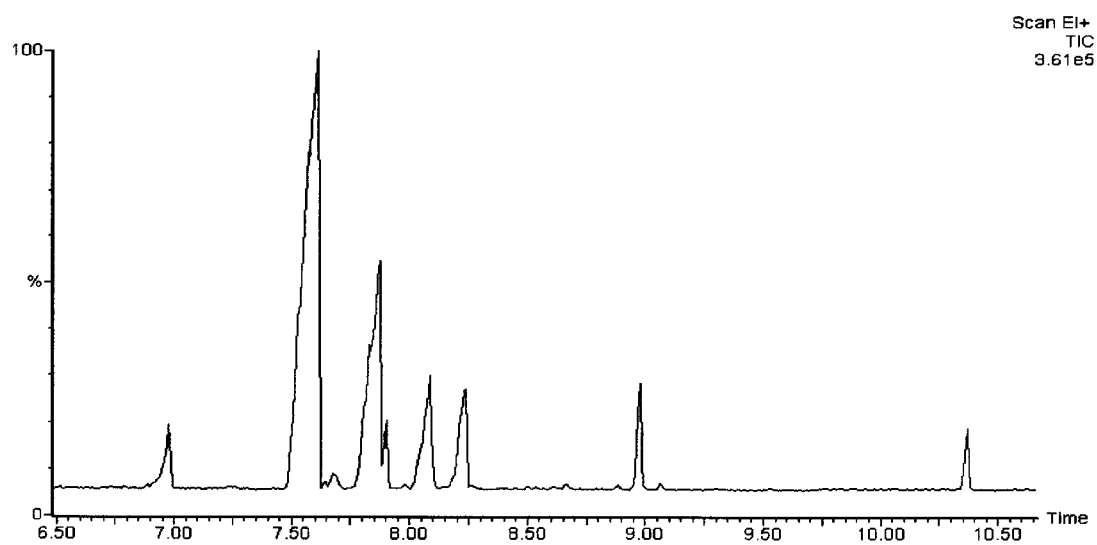
FIG. 9 is a GC/MS chart of an essential oil fraction of an extract of rosemary prepared according to the present invention.

The chromatograms of all of the samples were very similar; all principal peaks were present in each of the chromatograms and at very close to the same height. A representative chromatogram, that of the sample obtained from Ungerer, is depicted in FIG. 8. The chromatogram of a sample of the essential oil distillate collected from the process of the present application is depicted in FIG. 9. These chromatograms demonstrate that the essential oil fraction recovered using the process of the present invention should perform as a suitable substitute for commercially available oil of rosemary products.

Figure 10:
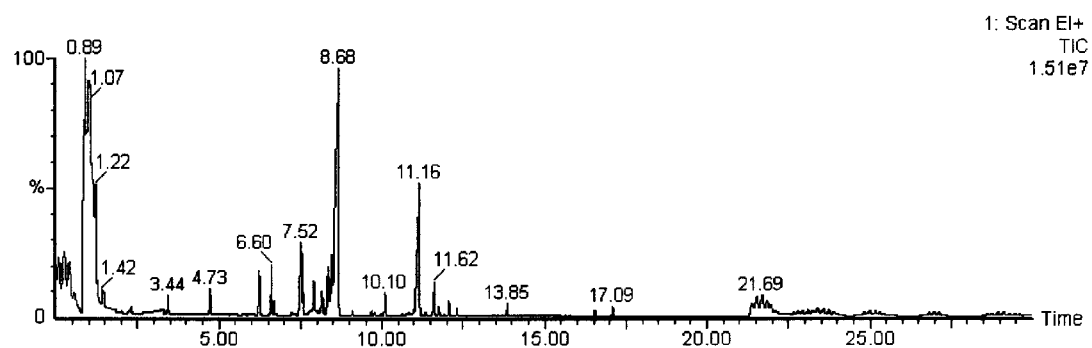
FIG. 10 is a GC/MS headspace chart of a solvent blend extract of rosemary prepared according to the present invention prior to being processed through the rolled film evaporator.
Figure 11:
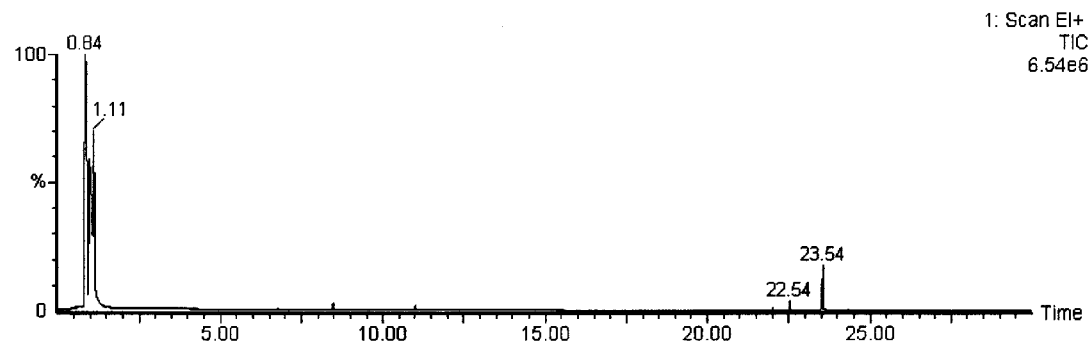
FIG. 11 is a GC/MS headspace chart of a residue fraction of a solvent blend extract of rosemary prepared according to the present invention after the essential oil fraction has been removed by being processed through the rolled film evaporator

The removal of the essential oils from the crude extract of rosemary by the wipe or rolled film evaporator is shown by a comparison of a GC/MS Headspace chromatogram taken of the crude extract of rosemary after removal of the solvents by the thin film evaporator 24 (FIG. 10) and of a GC/MS Headspace chromatogram taken of the antioxidant residue after processing in the wipe film evaporator 28. The un-deodorized extract chromatogram is depicted in FIG. 10, and the processed extract chromatogram is depicted in FIG. 11. It is readily seen that the peaks present in the crude extract but missing from the processed, antioxidant extract represent the peaks of the essential oil component of FIG. 9.

Although the invention has been described with respect to a preferred embodiment thereof, it is to be also understood that it is not to be so limited since changes and modifications can be made therein which are within the full intended scope of this invention as defined by the appended claims.

I claim:

1. A method of extracting antioxidants and essential oils from plants of Lamiaceae species, comprising the steps of:
   a. using an organic solvent to obtain an extract containing compounds including antioxidants and essential oils from plant material of a plant of the Lamiaceae species;
   b. removing the organic solvent to create an extract product;
   c. processing the extract product in an evaporator operated at a temperature and pressure which evaporates the essential oil fraction from the extract product while leaving the antioxidant compounds in a residue; and
   d. condensing the essential oils in a distillate.

2. A method as defined in claim 1, wherein the organic solvent comprises a blend of tetrafluoroethane and at least one other organic solvent.

3. A method as defined in claim 1, wherein the organic solvent comprises a blend of tetrafluoroethane and at least one organic solvent selected from the group consisting of acetone, ethanol, methanol, butane, propane, and hexane.

4. A method as defined in claim 3, wherein the organic solvent is a blend of between about 60% and about 95% tetrafluoroethane, between about 5% and about 40% acetone, and between about 5% and about 40% methanol.

5. A method as defined in claim 1, wherein the step of removing the organic solvents includes passing the extract through a thin film evaporator.

6. A method as defined in claim 1, further comprising the step of adding an oil to the extract product prior to processing the extract product in the evaporator to allow operation of the operator at a higher temperature, a lower pressure, or both, than could be used with the extract product in the absence of the oil.

7. A method as defined in claim 1, further comprising the step of adding a surfactant to the extract product prior to processing the extract product in the evaporator to allow operation of the operator at a higher temperature, a lower pressure, or both, than could be used with the extract product in the absence of the surfactant.

8. A method as defined in claim 1, wherein the evaporator is a wipe film or rolled film evaporator.

9. A method as defined in claim 1, wherein said Lamiaceae species is selected from the group consisting of mint, thyme, sage, and rosemary.

10. A method of extracting antioxidants and essential oils from plants of Lamiaceae species, comprising the steps of:
 a. using an organic solvent to obtain an extract containing compounds including antioxidants and essential oils from plant material of a plant of the Lamiaceae species;
 b. removing the organic solvent to create an extract product;
 c. processing the extract product in an evaporator operated at a temperature and pressure which evaporates water and a portion of the essential oil fraction from the extract product while leaving the antioxidant compounds;
 d. processing the antioxidant component in the evaporator operated at an elevated temperature and reduced pressure to evaporate substantially all of the remaining essential oil fraction while leaving the antioxidant compounds in a residue; and
 e. condensing the essential oils in a distillate.

11. A method of simultaneously producing from plants of the Lamiaceae species a distillate containing essential oils and a residue containing antioxidant compounds, comprising the steps of:
 a. contacting plant material of a plant of the Lamiaceae species with an organic solvent to obtain an extract containing compounds including antioxidants and essential oils;
 b. evaporating the organic solvent to create an extract product;
 c. processing the extract product in an evaporator operated at a temperature and pressure which evaporates the essential oil fraction from the extract product while leaving the antioxidant compounds in a residue; and
 d. condensing the essential oils in a distillate.

12. A residue produced according to the method of claim 1, wherein the residue comprises between about 10% and about 50% antioxidant compounds.

13. A residue produced according to the method of claim 1, wherein the Lamiaceae species is rosemary and wherein the residue comprises between about 10% and about 50% carnosic acid.

14. A residue produced according to the method of claim 1, wherein the residue is substantially free of essential oils.

15. A distillate produced according to the method of claim 1, wherein the distillate has a gas chromatogram comparable to that of essential oil distillates produced by steam distillation.

* * * * *